United States Patent Office 2,999,113
Patented Sept. 5, 1961

2,999,113
TRINITROETHYL TRINITROPHENYL NITRAMINE
Delore L. Kouba, Newport, Del., assignor, by mesne assignments, to the United States of America as represented by the Secretary of the Navy
No Drawing. Filed May 7, 1952, Ser. No. 286,596
1 Claim. (Cl. 260—577)

This invention relates to a new compound, trinitroethyl trinitrophenyl nitramine.

The new compound of the invention is a yellow-brown solid which is fairly stable at room temperature. Its properties make its use as an explosive highly feasible. For example, it has a favorable oxygen balance and a sensitivity to impact in the range of that of RDX.

The new compound was prepared by the nitration of β-trinitroethylphenylamine. This later compound was prepared by the condensation of aniline with trinitroethanol as fully described in co-pending application Serial No. 286,602, filed May 7, 1952, by Robert H. Saunders.

It is an object of this invention to provide a new compound, trinitroethyl trinitrophenyl nitramine.

The invention is illustrated by the following example, but is not limited thereto.

Example 0.5 gram of β-trinitroethylphenylamine was dissolved in 6 grams of 95 percent sulphuric acid which was in turn added dropwise while agitating to 4 grams of 80 percent nitric acid. The temperature of the nitration was kept between 55 and 65° C. for 15 minutes by external heating. After drowning, filtering and washing a yellow-brown solid was obtained. The compound has the following formula:

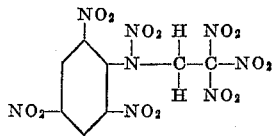

The percentage composition calculated for $C_8H_4N_8O_{14}$ is 22.0 percent carbon, 0.9 percent hydrogen, 25.7 percent nitrogen and the remainder oxygen.

Analysis of the compound gave 22.5 percent carbon, 0.9 percent hydrogen and 25.9 percent nitrogen.

The compound has a melting point of 150° C. It has an oxygen balance of —15. Its impact sensitivity was found to be 27 as determined with the Bureau of Mines impact machine, this figure being the distance in centimeters a 2 kilogram weight was required to fall in order to produce 50% shots.

It is thus seen from the above that there has been provided a new compound having properties making its utility as an explosive highly feasible.

What is claimed is:

Trinitroethyl trinitrophenyl nitramine having the following structural formula:

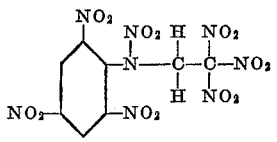

References Cited in the file of this patent

UNITED STATES PATENTS 2,292,212    Dickey et al. _____ Aug. 4, 1942